United States Patent [19]

DiGrassi

[11] Patent Number: 4,833,822
[45] Date of Patent: May 30, 1989

[54] MULCH STRIP

[76] Inventor: Paul DiGrassi, 70 Bull Hill La., West Haven, Conn. 06516

[21] Appl. No.: 140,727

[22] Filed: Jan. 4, 1988

[51] Int. Cl.$^4$ .............................................. A01G 13/06
[52] U.S. Cl. .............................................. 47/9; 47/2
[58] Field of Search .................... 47/56, 9, 14, 15, 16, 47/2, 25

[56] References Cited

U.S. PATENT DOCUMENTS

| | | | |
|---|---|---|---|
| 1,372,996 | 3/1921 | Eckart | 47/9 |
| 2,015,471 | 9/1935 | Genuit | 47/26 |
| 2,030,267 | 2/1936 | Pratt | 47/9 |
| 2,058,934 | 10/1936 | Yohe | 47/26 |
| 2,909,328 | 10/1959 | Babyak | 47/25 X |
| 2,974,442 | 3/1961 | Womelsdorf | 47/26 |
| 3,154,885 | 11/1964 | Waterman et al. | 47/26 |
| 3,205,619 | 9/1965 | Henry | 47/9 |
| 3,206,892 | 9/1965 | Telkes et al. | 47/9 X |
| 3,727,345 | 4/1973 | Smith | 47/2 |
| 3,857,195 | 12/1974 | Johnson | 47/25 X |
| 4,023,506 | 5/1977 | Robey | 47/26 |
| 4,044,501 | 8/1977 | Frydryk | 47/26 |
| 4,071,974 | 2/1978 | Tripp, Jr. | 47/9 X |
| 4,120,797 | 10/1978 | Huebner | 210/522 |
| 4,241,671 | 12/1980 | Joyner et al. | 110/188 |

FOREIGN PATENT DOCUMENTS

| | | | |
|---|---|---|---|
| 2504352 | 10/1982 | France | 47/28 R |
| 2544960 | 11/1984 | France | 47/9 |
| 611117 | 5/1979 | Switzerland | 47/9 |
| 487619 | 1/1976 | U.S.S.R. | 47/9 |

Primary Examiner—Robert A. Hafer
Assistant Examiner—Kevin G. Rooney
Attorney, Agent, or Firm—Jerry T. Kearns

[57] ABSTRACT

A mulch strip consists of an elongated base sheet formed from a flexible plastic material having a pair of parallel fluid reservoir tubes extending along the length of the base strip, down opposite side edges of the strip. Each of the fluid reservoir tubes is provided with a hose fitting for connection with a conventional garden hose for filling the reservoir tubes with water. In use, the water filled tubes serve to hold the mulch strip in place, and form a channel for retaining rain water on the surface of the strip. The fluid reservoir tubes also collect heat and serve to keep the ground beneath the strip warm after sunset. A plurality of concentric perforations are spaced along the length of the base sheet for the insertion of plants into the ground through the base sheet. Spaced peg holes are provided around the periphery of the base sheet which allow pegs to be inserted through the holes to retain the mulch strip in place. The fluid reservoir tubes may be provided with a male hose connection at one end and a female hose connection at an opposite end so that a series of mulch strips may be connected together in end to end relation. In this fashion, a plurality of connected mulch strips may be filled without repeated reconnection of the garden hose.

1 Claim, 3 Drawing Sheets

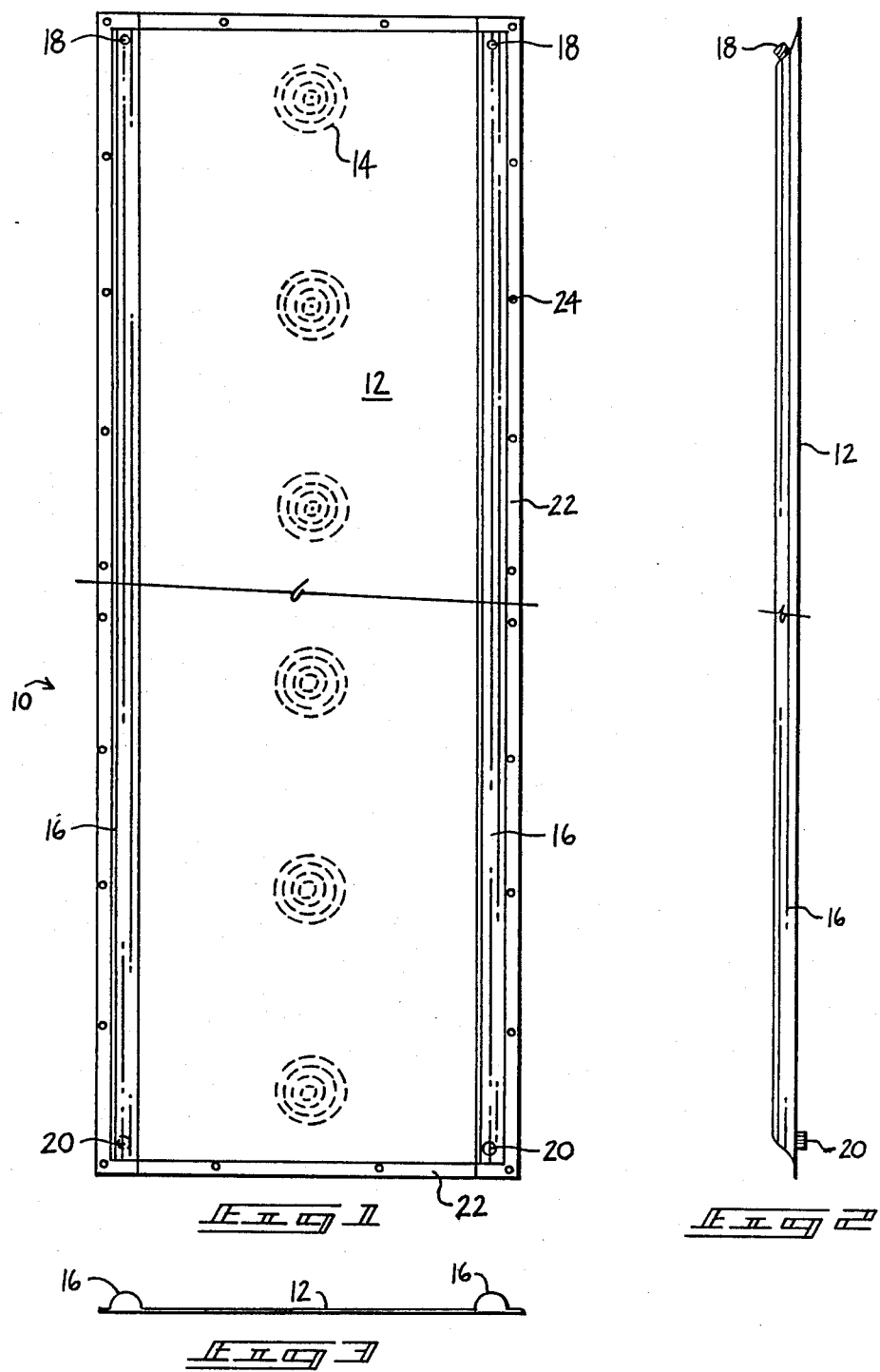

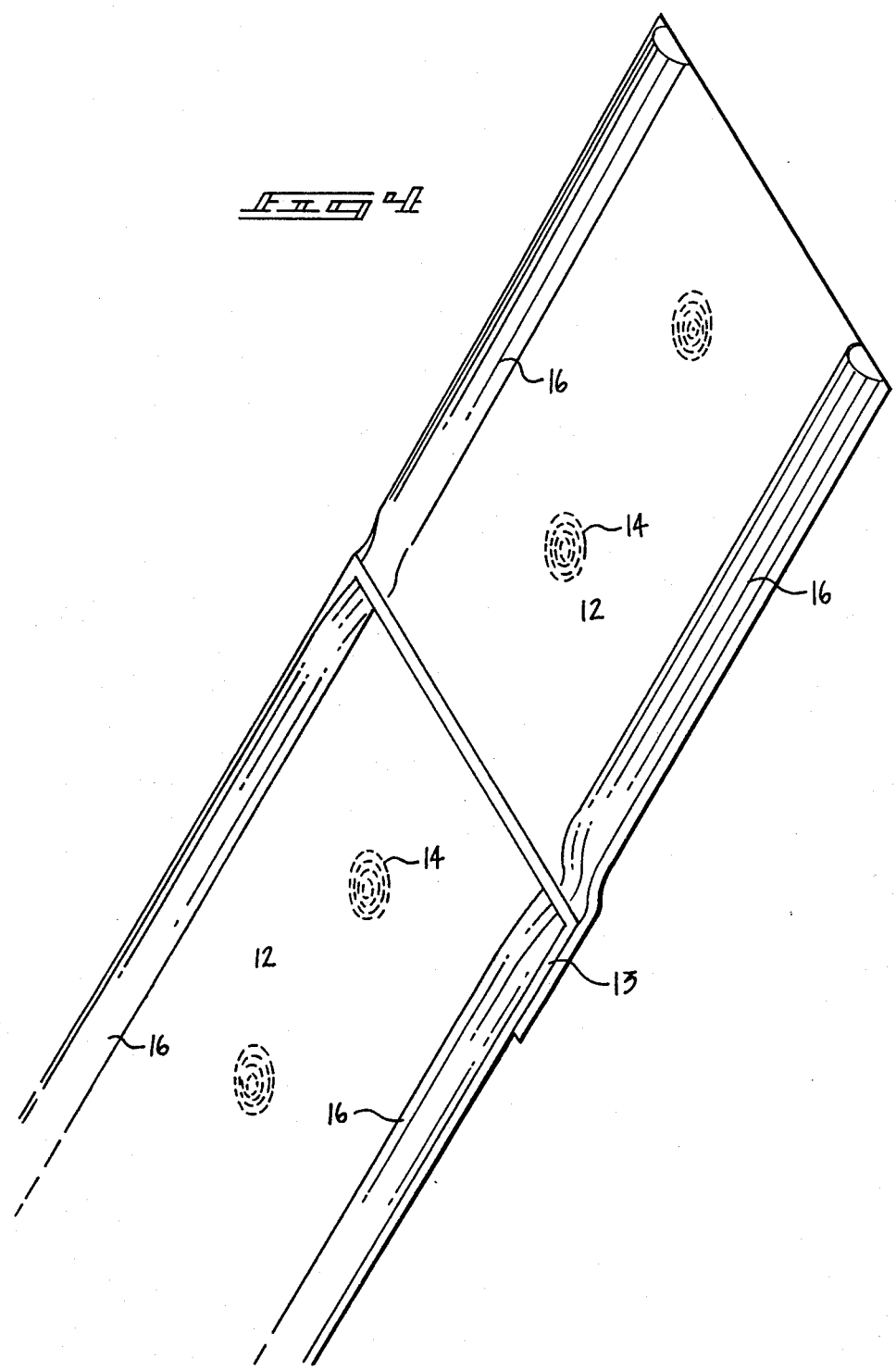

MULCH STRIP

BACKGROUND OF THE INVENTION

1. Field of the Invention

The present invention relates to mulch strips, and more particularly pertains to a new and improved mulch strip with facilities for retaining rain water and warming the ground beneath the strip. Conventionally, various types of plastic mulch sheeting is utilized to prevent weeds from growing amongst cultivated plants. The cultivated plants are planted in the ground through holes spaced along the plastic mulch strip. The mulch strip retains moisture in the ground and prevents evaporation as well as providing weed control. Such plastic mulch strips have been found especially useful when growing food crops such as strawberries, because the mulch strip prevents the berries from contacting the surface of the ground and becoming subject to mold. While these conventional forms of mulch strips have many advantages, rain water which falls on the surface of the mulch strip is not retained on the strip for the benefit of the cultivated plants. Additionally, the conventional forms of mulch strips do not provide suitable means for retaining the mulch strip on the ground in the desired location. In order to overcome these disadvantages, and to provide a ground mulch strip with heat retaining capabilities, the present invention provides a new and improved mulch strip.

2. Description of the Prior Art

Various types of mulch strips are known in the prior art. A typical example of such a mulch strip is to be found in U.S. Pat. No. 2,015,471, which issued to J. Genuit on Sept. 24, 1935. This patent discloses a plant protection strip formed from a spiral wound roll of paper having elongated reinforcing strips. In use, the plant protection strip is supported on stakes inserted in the ground, thus forming an awning for sheltering a row of cultivated plants. U.S. Pat. No. 2,058,934, which issued to L. Yohe on October 27, 1936, discloses a plant receptacle which utilizes a screen or cheese cloth netting to shelter plants. U.S. Pat. No. 2,974,442, which issued to L. Womelsdorf on March 14, 1961, discloses a woven shade cloth for the protection of cultivated plants. The shade cloth is adapted to be suspended on a framework above the plants. U.S. Pat. No. 3,154,885, which issued to R. Waterman et al on November 3, 1964, discloses a shade cloth formed from a weather fleck held together by an elastomeric binder and treated with an air purifying agent. The shade cloth is utilized to provide protection to tobacco plants. U.S. Pat. No. 4,023,506, which issued to M. Robey on May 17, 1977, discloses a netting material through which natural grass is grown on the surface of an athletic playing field. The netting serves to provide enhanced durability to the grass playing field. U.S. Pat. No. 4,044,501, which issued to J. Frydryk on August 30, 1977, discloses a mulch strip with folded over side edges for preventing tearing of the mulch strip. A plurality of spaced apertures are provided along the reinforced edges of the strip for the reception of pegs utilized in securing the strip to a desired location on the surface of the ground.

While the above mentioned devices are suited for their intended usage, none of these devices provide a mulch strip with parallel fluid reservoir tubes extending along opposite side edges of a plastic base sheet. Additionally, none of the aforesaid prior art devices utilize a mulch strip with fluid reservoir tubes having male and female hose connections for connecting a plurality of the mulch strips together in end to end relation. Inasmuch as the art is relatively crowded with respect to these various types of mulch strips, it can be appreciated that there is a continuing need for and interest in improvements to such mulch strips, and in this respect, the present invention addresses this need and interest.

SUMMARY OF THE INVENTION

In view of the foregoing disadvantages inherent in the known types of mulch strips now present in the prior art, the present invention provides an improved mulch strip. As such, the general purpose of the present invention, which will be described subsequently in greater detail, is to provide a new and improved mulch strip which has all the advantages of the prior art mulch strips and none of the disadvantages.

To attain this, a representative embodiment of the concepts of the present invention is illustrated in the drawings and makes use of an elongated base sheet formed from a flexible plastic material. A pair of tubular fluid reservoirs extend along the length of the base sheet, down opposite side edges of the sheet. A plurality of concentric perforated rings may be spaced along the length of the base sheet, to allow plants to be inserted through the base sheet into the ground. The tubular reservoirs may each be provided with a male hose connection on one end and a female hose connection on the opposite end so that a plurality of mulch strips according to the present invention may be connected together in end to end relation. In this fashion, the tubular fluid reservoirs of all the strips may be filled without necessitating the laborious repeated connection of a garden hose to each of the fittings. A plurality of peg holes are spaced around the periphery of the base sheet for the reception of pegs utilized in securing the mulch strip to the surface of the ground at a desired location.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mulch strip which has all the advantages of the prior art mulch strips and none of the disadvantages.

It is another object of the present invention to provide a new and improved mulch strip which may be easily and efficiently manufactured and marketed.

It is a further object of the present invention to provide a new and improved mulch strip which is of a durable and reliable construction.

An even further object of the present invention is to provide a new and improved mulch strip which is susceptible of a low cost of manufacture with regard to both materials and labor, and which accordingly is then susceptible of low prices of sale to the consuming public, thereby making such mulch strips economically available to the buying public.

Still yet another object of the present invention is to provide a new and improved mulch strip which provides in the apparatuses and methods of the prior art some of the advantages thereof, while simultaneously overcoming some of the disadvantages normally associated therewith.

Still another object of the present invention is to provide a new and improved mulch strip which utilizes tubular fluid reservoirs to assist in warming the ground beneath the mulch strip, retaining rain water on the mulch strip and holding the mulch strip in place at the desired location.

Yet another object of the present invention is to provide a new and improved mulch strip which utilizes a plurality of concentric perforated rings to allow plants to be inserted through the mulch strip into the ground.

Even still another object of the present invention is to provide a new and improved mulch strip which utilizes tubular fluid reservoirs provided with a male hose connection at one end and a female hose connection at the opposite end so that a plurality of mulch strips may be connected together in end to end relation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above Will become apparent when consideration is given to the following detailed description thereof. Such description makes reference to the annexed drawings wherein:

FIG. 1 is a top view of the mulch strip according to the present invention.

FIG. 2 is a side view of the mulch strip according to the present invention.

FIG. 3 is an end view illustrating the mulch strip of the present invention.

FIG. 4 is a perspective view illustrating two mulch strips according to the present invention connected together in end to end relation.

DESCRIPTION OF THE PREFERRED EMBODIMENT

Figure 5:
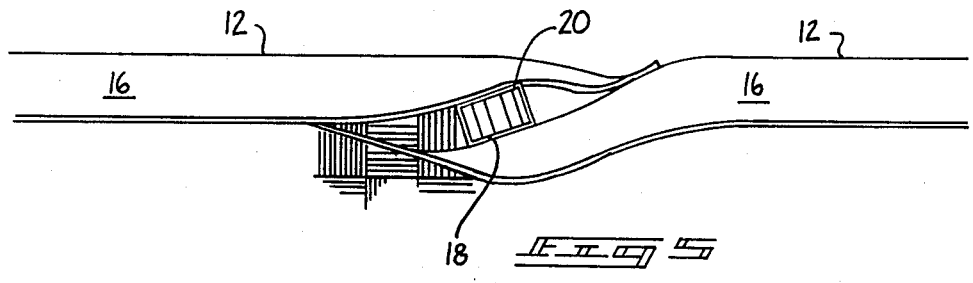
FIG. 5 is a side view illustrating two mulch strips according to the present invention connected together in end to end relation.

With reference now to the drawings, and in particular to FIG. 1 thereof, a new and improved mulch strip embodying the principles and concepts of the present invention and generally designated by the reference numeral 10 will be described.

More specifically, it will be noted that the first embodiment 10 of the invention includes an elongated base sheet 12 constructed from a thin flexible plastic material. The base sheet 12 may be formed from the black plastic material utilized in conventional mulch sheeting. A plurality of concentric perforated rings 14 are spaced along the length of the base sheet 12. By removing the perforated rings of the appropriate diameter, a variety of various sizes of plants or flower pots may be inserted through the surface of the base sheet 12 into the ground below. A pair of elongated tubular fluid reservoirs 16 extend along the length of base sheet 12, down opposite side edges of the base sheet 12. A pair of hose connections 18 and 20 are provided on each of the tubular fluid reservoirs 16 for connection to a conventional garden hose. The peripheral edges 22 of the base sheet 12 are provided with a plurality of spaced peg holes 24 for the reception of pegs or spikes utilized to secure the base sheet 12 to the surface of the ground in a desired location. It is contemplated that the peripheral edges 22 may be suitably reinforced by folding over the edges of the base sheet 12 and heat welding. In this fashion, the edges 22 of the base sheet 12 will be resistant to tearing.

As shown in FIG. 2, a male hose fitting 18 is formed at one end of each tubular fluid reservoir 16 and a female hose connection 20 is provided at the opposite end. A plurality of the mulch strips 10 of the present invention may be connected together in end to end relation. As an alternative, the fluid reservoirs 16 may each be provided with a single male or female hose connection. The tubular fluid reservoir 16 will be constructed from a durable abrasion resistant plastic material which is either heat welded to the base sheet 12, or formed separately and merely placed on the surface of the base sheet 12, after the base sheet 12 has been secured to the surface of the ground in the desired location. The tubular fluid reservoir 16 may be utilized with conventional forms of plastic mulch strips, or just placed adjacent newly planted seedlings to retain heat.

As shown in FIG. 3, the tubular fluid reservoirs 16 extend along the side edges of the base sheet 12 and project above the surface of the sheet 12.

As shown in FIG. 4, a plurality of the mulch strips 10 may be connected together in end to end relation, as shown by the overlapping joint 13. This connection is achieve by coupling the male hose connections 18 of one mulch strip 10 with the female hose connections 20 of another mulch strip 10.

In FIG. 5, a side view is provided illustrating the end to end coupling of two mulch strips 10 according to the present invention.

Figure 6:
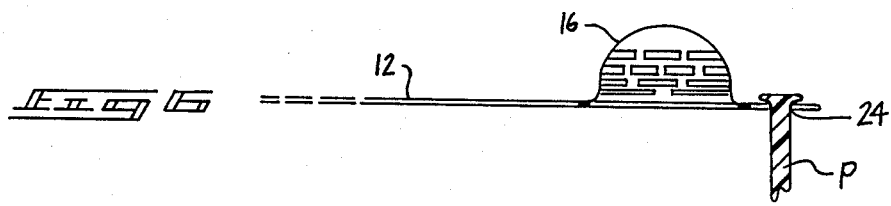
FIG. 6 is a detail end view, illustrating the manner of securing the mulch strip of the present invention at a desired location on the surface of the ground.

In FIG. 6, a detail view is provided illustrating the manner of securing the base sheet 12 with a peg P inserted through one of the peg holes 24 of the base sheet 12 and into the ground. Due to the high heat capacity of the water within the fluid reservoir 16, heat will be stored within the fluid reservoir 16 by virtue of sun shining on the fluid reservoir 16 during the daylight hours. This heat will subsequently be transferred to the ground, maintaining the ground at a higher than normal temperature after sunset. This warming of the surface of the ground will assist in the cultivation of plants, especially during the early spring time. The tubular fluid reservoir 16 also serve to form a channel which retains rain water on the surface of the base sheet 12 for absorption by the cultivated plants through the spaced perforations 14.

Figure 7:
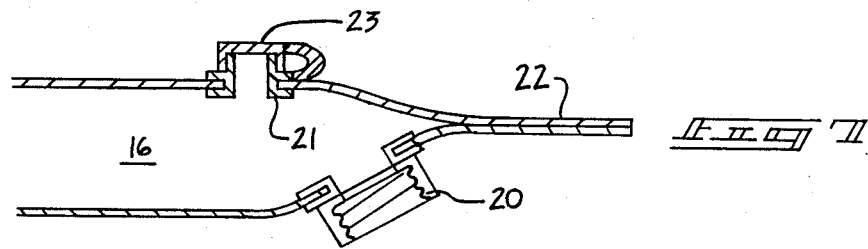
FIG. 7 is a cross sectional detail view illustrating one end of a mulch strip according to the present invention.

In FIG. 7, a cross sectional view is provided illustrating a female hose connection 20 at one end of a tubular fluid reservoir 16.

An air vent 21, to facilitate filling of the tube 16, is located opposite the connection 20, and has an aperture diameter from one fourths to three eights of an inch and a removable cap 23.

Figure 8:
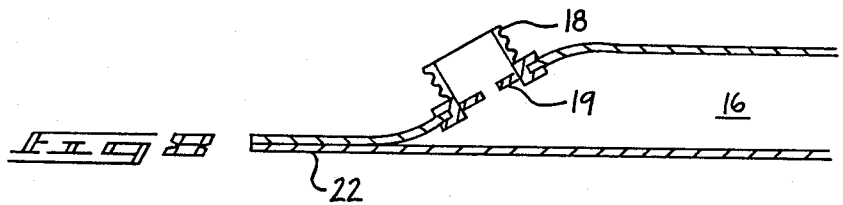
FIG. 8 is a cross sectional detail view illustrating the opposite end of a mulch strip according to the present invention.

In FIG. 8, a cross sectional detail view is provided illustrating a male hose connection 18 at an opposite end of the tubular fluid reservoir 16. A restriction plate 19 limits water pressure in the reservoir 16 during filling to prevent bursting.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mulch strip, comprising:
   an elongated base sheet formed from a thin flexible plastic material;
   a plurality of peg holes spaced around a periphery of said base sheet;
   a plurality of spaced circular concentric ring perforations spaced along the length of said base sheet;
   a pair of parallel tube fluid reservoirs extending along the length of said base sheet, down opposite side edges of said base sheet;
   said tube reservoirs formed from a tough, abrasion resistant flexible plastic sheet material heat welded to said base sheet;
   a male hose fitting on an upper surface at one end of each of said tube reservoirs and a female hose fitting on a lower surface at an opposite end of each of said tube reservoirs, such that a plurality of mulch strips may be interconnected in end to end relation by coupling said male and female hose fittings;
   a restriction plate in each of said male hose fittings having a reduced diameter orifice to limit fluid pressure in said tube reservoirs; and
   a selectively openable air vent on each of said tube reservoirs to facilitate filling.

* * * * *